Figure 1:
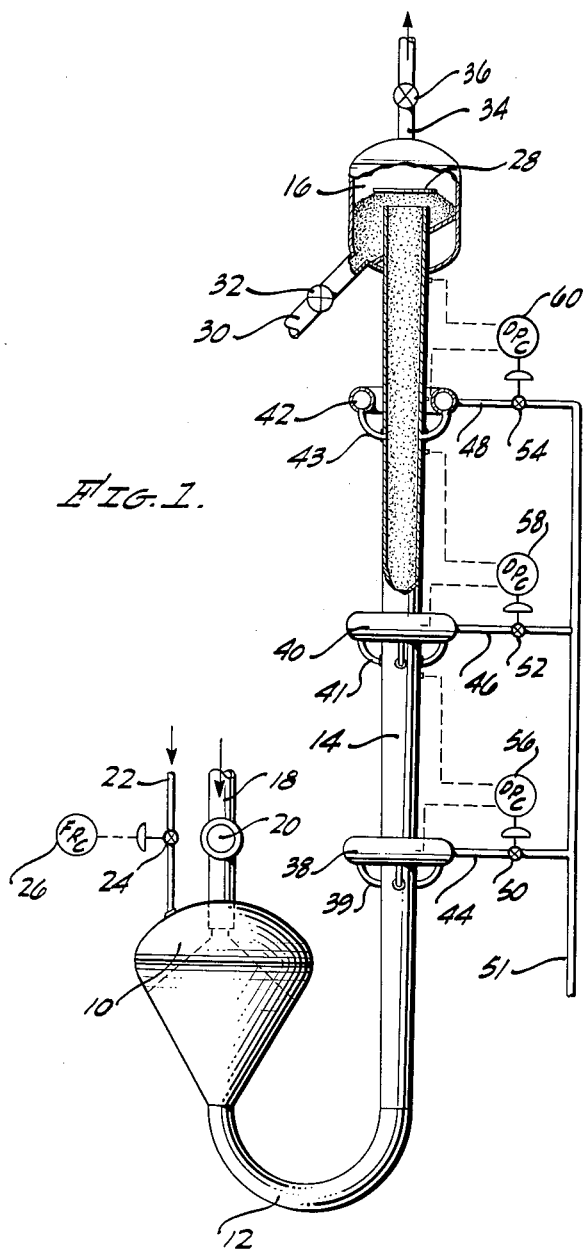

March 27, 1956 — C. H. O. BERG — 2,739,845
CONVEYANCE OF GRANULAR SOLIDS
Filed Jan. 26, 1951

FORCE RATIO & PRESSURE

INVENTOR.
CLYDE H. O. BERG,
BY
ATTORNEY.

United States Patent Office 2,739,845
Patented Mar. 27, 1956

2,739,845

CONVEYANCE OF GRANULAR SOLIDS

Clyde H. O. Berg, Long Beach, Calif., assignor to Union Oil Company of California, Los Angeles, Calif., a corporation of California Application January 26, 1951, Serial No. 208,020

20 Claims. (Cl. 302—29)

This invention relates to the conveyance or transportation of granular solids and in particular relates to a process and apparatus for the movement of such solids in substantially compact form as a continuous moving phase through a conduit under the influence of a cocurrently depressuring conveyance fluid.

The movement of granular solids in appreciably large quantities presents a technical problem in many industrial operations such as the movement of cracking catalysts in the well-known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized to prevent an economic disadvantage. Such conditions are pronounced in the transportation of expensive granular catalysts which are required to be circulated at rates of as high as 800 to 1,000 tons per hour as, for example, in large scale catalytic cracking processes employing high catalyst-to-oil ratios.

Conventionally granular solids are conveyed by moving mechanical equipment such as bucket elevators, the various forms of belt conveyors and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, bucket elevators necessary to transport cracking catalyst at a rate of about 150 tons per hour are approximately 4 feet in length, 1 foot in width, and 1½ feet deep. Furthermore, the maintenance of the necessary driving mechanism at temperatures of the order of those in the cracking processes is difficult and expensive, and the quantity of granular solids lost by attrition in loading and unloading the buckets is frequently excessive.

It is therefore an object of the present invention to provide an improved method for the conveyance of granular solids through relatively small sized equipment at relatively high volumetric flow rates without the disadvantages inherent in moving mechanical conveyors.

It is an additional object of this invention to provide a method for the conveyance of granular solids in which no moving mechanical equipment is employed and the conveyance is effected by a depressuring cocurrent flow of a conveyance fluid through a conduit carrying the granular solids in substantially compact form.

A particular object of the present invention is to provide a process for the conveyance of compact granular solids whereby compensations in the conveyance fluid flow are automatically made to correct for changes in operating conditions, including changes in the physical characteristics of the solids.

It is another object of this invention to provide an improved apparatus for accomplishing the above-mentioned objects.

Other objects and advantages of the present invention will become apparent to those skilled in the art as the description thereof proceeds.

Briefly, the present invention comprises an improved solids conveyance process wherein the granular solids are introduced into an elongated conveyance zone, are conveyed therethrough by means of a cocurrently depressuring conveyance fluid and are maintained during conveyance in substantially compact form. (The condition of granular solids designated as "substantially compact form" is hereinafter more specifically defined or described in connection with tests for determining the existence or non-existence of such condition.) The depressuring conveyance fluid flowing through the interstices of the porous granular moving mass generates a pressure gradient throughout the mass in the direction of solids and fluid flow which, if sufficient in magnitude, causes solids motion by overcoming opposing forces of gravity and friction. The ratio of the force of the pressure gradient to the opposing gravitational force only in a conveyance zone is called the conveyance force ratio and is given by $$\frac{\frac{dp}{dl}}{\rho_s \cos \theta}$$

wherein $$\frac{dp}{dl}$$

is the pressure gradient along the length of the conveyance zone in pounds per square foot per foot, $\rho_s$ is the bulk density of the granular solids in pounds per cubic foot, and $\theta$ is the angular deviation of the conveyance zone from a vertical axis. (Other consistent units may be substituted.) This ratio is 1.0 when the conveyance force is equal to the opposing gravitational force acting along the axis of the conveyance zone. Thus a vertical conveyance zone requires a greater pressure gradient than a sloping or a horizontal conveyance zone. These theoretical minimum values must be exceeded to overcome friction forces to cause solids motion. Usually the ratio in typical conveyance zones in accordance with this invention is between about 1.01 and about 2.0 and for maximum conveyance efficiency is maintained substantially constant, preferably at the lowest values at which friction also is overcome throughout the conveyance zone by means described below.

The conveyance fluid may be liquid or gaseous. A consideration of the coefficient of expansion of the particular fluid employed is necessary in order that a constant conveyance force ratio be maintained throughout the conveyance zone. When liquid fluids are used or gaseous fluids are employed under conditions wherein the total pressure drop through the conveyance zone is less than about 5 per cent of the absolute pressure, the expansion of the conveyance fluid is generally insufficient to require special means for maintaining a constant conveyance force ratio. In the other cases when gaseous fluids are used with a pressure drop exceeding about 5 per cent of the absolute pressure, the expansion of the fluid causes substantial fluid velocity changes which result in the similar variations of the conveyance force ratio within the conveyance zone.

An additional factor must be considered in the maintenance of constant force ratios which is dependent upon the contribution (upon pressure decrease) of part of the conveyance fluid present in the void spaces of the solids to that part of the conveyance fluid which is considered to be flowing through the interstices of the granular solids. That is, the mass of conveyance fluid present in the interstices of the solids is greater at the line inlet than at the outlet. Thus, not only does expansion of the flowing conveyance fluid cause changes in the conveyance fluid velocity and the force ratio but also the expansion of conveyance fluid carried in the void spaces between individual particles has a contributing effect.

In order to compensate for these and other factors it has been found that by increasing the cross-sectional area of the conveyance zone in the direction of solids flow a constant conveyance fluid velocity and force ratio may be maintained. For flows of gaseous fluid it has been found that the taper of the conveyance zone, or the change in cross-sectional area with distance from its inlet, required to maintain a constant force ratio, is correlated by the following equation:

$$\frac{A_2}{A_1} = \frac{1}{A_1}\left(\frac{aQ}{\rho_s}\right)\left(\frac{M.W.}{RT}\right)^{1-\frac{1}{n}}(P_1-P_2)\left(\frac{C}{P_2\frac{dp}{dl}}\right)^{\frac{1}{n}} + \left(\frac{P_1}{P_2}\right)^{\frac{1}{n}}$$

wherein $a$ is the void fraction of the bulk of the solids; no units,
$A$ cross-sectional area of conduit; square feet,
$C$ permeability constant as determined from:

$$\frac{dp}{dl} = C\rho^{n-1}V^n$$

wherein $$\frac{dp}{dl}$$

is pressure gradient; pounds per square foot per foot, $\rho$ is the fluid density; pounds per cubic foot,
$V$, superficial gas velocity; feet per second,
$n$, exponent; 1.0 for viscous flow and 1.85 for turbulent flow,
M. W., molecular weight of conveyance fluid,
P, pressure in conduit; pounds per square foot,
Q, solids flow rate; pounds per second,
R, gas constant; 1543 foot pounds per °R. per pound mol,
T, temperature; °R.=460+°F.,
$\rho_s$ bulk density of solids; pounds per cubic foot,
1, subscript; reference to inlet of conduit section considered.
2, subscript; reference to outlet of conduit section considered.
(Other consistent units may be substituted.)

Therefore by employing the above correlation to design a line for conveyance under certain specific conditions where the distance of conveyance and the characteristics of the solids are known, the change in pressure (which is linear) can be calculated knowing that $$\frac{\frac{dp}{d_3}}{\rho_s \cos \theta} \geq 1.0$$

for example, equals 1.1. The value of $A_1$ is determinable from well-known correlations of the rates of gravity flow of granular solids from orifices of various cross-sectional areas, an area capable of delivering the required flow rate under gravity flow being adequate in the present apparatus. From the required solids delivery rate the cross-sectional area $A_1$ is selected. The solids delivery rate Q is known and the void fraction $a$, the bulk density of the solids $\rho_s$, and the solids permeability factor C are determined from the granular solids physical characteristics by experimentation. $P_2$ is the desired line outlet pressure and $P_1$ is estimated from the length of the line and from a known value of the conveyance force ratio, for example a value of 1.1. The reverse procedure is permissible, i. e. the estimation of $P_2$ from a known $P_1$. Using Equation 1 and the foregoing data, a value of $A_2$ is determined. Preferably a design is effected by considering successive lengths of the conveyance zone, but an estimation of the taper may be made by a similar calculation for the entire length of the conveyance zone.

The foregoing design establishes the variation in cross-sectional area necessary to convey compact granular solids of known characteristics a required distance and at a known rate. It is completely adequate for delivering granular solids such as ore, pulverized fuel, pulverized raw materials employed in metallurgical industries, foundry molding sands and many other miscellaneous materials wherein the granular solids are conveyed once through.

For recirculatory solids handling processes such as the well-known Thermofor catalytic cracking process and similar operations, the flow rate may change and it is well established that the physical characteristics of the solids being conveyed change considerably with age and use. For example, the bulk density of the solids will increase with use and the voids fraction "$a$" usually decreases somewhat due to carbon contamination. The value of C changes as well. Additionally, the solids flow rate, the temperature of the system and the molecular weight of the conveyance fluid may change with operating conditions. It has been found that such changes, in a line closely designed for specific conditions and a certain type of granular solids, may adversely affect the operation and the flexibility of the conveyance process by requiring an inlet fluid pressure above the normal value to maintain solids conveyance. For example, with a given taper and constant $P_1$ the conveyance force ratio decreases with decreases in $a$, Q, C and the molecular weight and with increases in T and $\rho_s$. In severe cases in which these factors change simultaneously and increases in inlet pressure are not possible the conveyance force ratio may be so adversely affected as to decrease it to a value less than 1.0, thus halting and preventing solids motion.

Therefore the conveyance process according to the present invention is improved by specifically providing a conveyance zone having a maximum ratio of $$\frac{A_2}{A_1}$$

or taper predicted from the correlation above in combination with the automatically controlled injection of supplemental conveyance fluid at spaced points along the length of the conveyance zone. Thus, the improved conveyance zone has the maximum value of $$\frac{A_2}{A_1}$$

given by the maximum expected values of $a$, Q, M. W. and C, and the minimum expected values of $\rho_s$ and T from the correlation above.

In a conveyance zone in which an excessive taper is employed the maintenance of the design inlet pressure $P_1$ effects a flow of conveyance fluid which is sufficient to establish the required force ratio near the inlet of the line but is insufficient to maintain a conveyance force ratio in excess of 1.0 throughout the length of the zone, and particularly is this true when the operating conditions and the characteristics of the solids are normal; that is, are not the maximum and minimum expected values defined above. Therefore, at spaced points along the length of the conveyance zone additional quantities of conveyance fluid are injected to flow cocurrently with the solids in admixture with the main portion of conveyance fluid introduced at the inlet of the conveyance, together with the granular solids. The quantity of the supplemental fluid which is required to be introduced along the length of the conveyance zone varies considerably with the operating conditions and the characteristics of the solids. Therefore, according to the present invention each stream of supplemental conveyance fluid is controlled in quantity in accordance with and to maintain a predetermined pressure gradient over a particular interval of length in the conveyance zone.

A differential pressure controller is set to actuate an automatic throttling valve in accordance with a predetermined differential pressure and the quantity of supplemental conveyance fluid introduced in each stream is made automatically variable to maintain this required pressure gradient, i. e.

$$\frac{dp}{dl} > \rho_s \cos \theta$$

Therefore, as operating conditions change and the physical characteristics of the solids vary, the quantity of supplemental conveyance fluid automatically changes to maintain a sufficient pressure gradient and consequently a sufficient conveyance force ratio to maintain solids motion. The resulting process is of extreme flexibility and it is found that the process and apparatus employing such automatically controlled supplemental fluid injection is capable of continuous operation over widely variant operating and solids conditions which are encountered in certain recirculatory solids processes.

Figure 2:
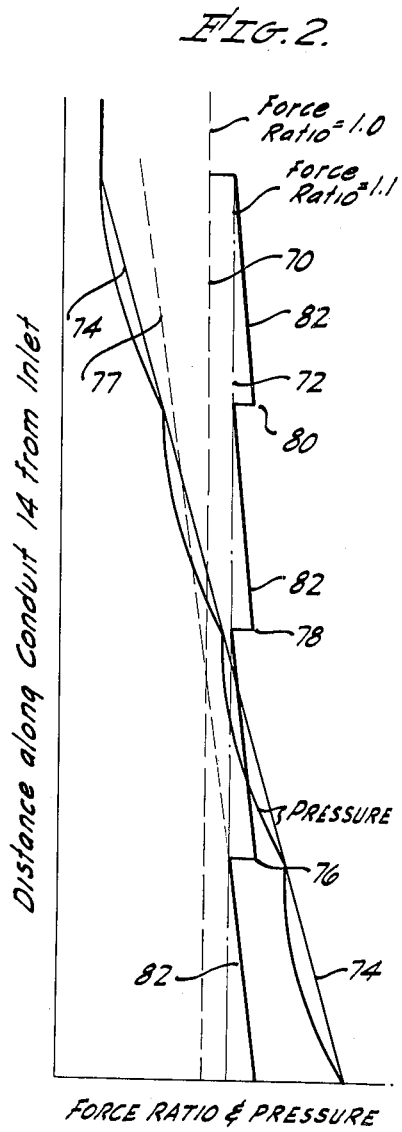

The process and the apparatus of the present invention will be more clearly understood by reference to the accompanying drawing, in which:

Figure 1 is an elevation view in partial cross-section of the improved conveyance apparatus according to this invention and, Figure 2 is a graph showing the variation in conveyance fluid pressure and in conveyance force ratio in the apparatus under various conditions of operation.

Referring now more particularly to Figure 1, the essential elements of the conveyance apparatus include induction zone or chamber 10, solids inlet or redirection section 12, conveyance conduit 14, and solids-fluid separator chamber 16. Granular solids are introduced via line 18 through control valve or pressuring means 20 into induction chamber 10. When element 20 comprises a control valve, intermittent introduction and conveyance of granular solids is obtained. When element 20 comprises a solids pressuring means such as one of the improved types of star feeders, a continuous introduction and conveyance of granular solids is obtained.

Conveyance fluid under pressure is introduced into induction chamber 10 via line 22 at a rate controlled by valve 24 in accordance with flow recorder controller 26. The granular solids flow by gravity downwardly through induction chamber 10 into redirection section 12 and therethrough cocurrently with the conveyance fluid under pressure. When a vertical conveyance conduit is employed a 180° return bend redirection section 12 is employed, and for a horizontal conveyance zone obviously a 90° turning conduit is used. The granular solids pass from induction zone 10 downwardly therefrom into redirection section 12 under the combined influence of the conveyance fluid and gravitational forces and within which the advantageous gravitational force is lost. By means of inlet section 12 granular solids are injected into conveyance conduit 14.

The granular solids pass upwardly cocurrently with the depressuring conveyance fluid through conduit 14 and are discharged into separator chamber 16. In order to maintain the granular solids in compact form during transit, means are provided for restricted discharge of granular solids from the outlet of the conveyance conduit. In the present modification, thrust plate 28 disposed adjacent and separated between 0.1 and 2.0 outlet diameters, and preferably 0.25 to 1.0 outlet diameters, from the outlet opening of conveyance conduit 14 is employed. This plate exerts a thrust force which opposes the force of moving solids and restricts the solids flowing from the conveyance conduit. Other means may be employed such as submerging the conduit outlet in a mass of solids in which a conveyance force ratio considerably less than 1.0 is maintained, or a transverse wire mesh may be substituted for thrust plate 28.

The granular solids thus conveyed are removed from separator chamber 16 via line 30 controlled by valve 32. Depressured conveyance fluid is removed from chamber 16 via line 34 at a rate controlled by back pressure regulator 36. This conveyance fluid may be repressured if desired and reintroduced via line 22 into induction chamber 10.

Along the length of conveyance conduit 14 are indicated a plurality of (3 are shown) supplemental conveyance fluid injection points. These consist of ring or toroidal manifolds 38, 40 and 42 communicating respectively via a plurality of tubes 39, 41 and 43 with the conveyance conduit. The manifolds are further provided respectively with conveyance fluid inlets 44, 46 and 48. The flow rates of conveyance fluid from manifold inlet 51 through each of the fluid inlets are controlled respectively by valves 50, 52 and 54. The degree of throttling of these valves is controlled respectively by differential pressure controllers 56, 58 and 60. Each of the differential pressure controllers is actuated by the pressure differential existing throughout a length of the conveyance zone adjacent the point at which the conveyance fluid is introduced. The differential pressure controllers 56, 58 and 60 are adjusted to open valves 50, 52 and 54 respectively under such conditions existing within the conveyance conduit which cause a decrease in the determined differential pressure existing between the pressure taps to which each differential pressure controller is connected and to close these valves on an increasing pressure differential. Thus, as the pressure gradient within the line decreases additional quantities of supplemental conveyance fluid are injected and as the pressure gradient increases the supplemental fluid is decreased. A predetermined desired conveyance force ratio is thereby maintained throughout each section of the conveyance conduit within the pressure taps of a differential pressure controller.

In some instances only one such supplemental injection of fluid is required and this occurs frequently in conveyance conduits of short length, such as between about 5 and 50 feet. In other cases in which the solids are conveyed distances from 50 to 200 or more feet, 2 to 20 or more supplemental injection points may be employed. Generally, they are spaced apart between 5 and 100 conveyance zone diameters. The actual number of supplemental inlets is determined strictly from the degree with which the conveyance force ratio changes under changes in conditions during operation and wherein the change is slight, few injection points are necessary and where the change is greater more inlet points are required. More inlets are needed in a vertical line than in a horizontal line of the same length.

Referring now more particularly to Figure 2, graphical data are shown illustrating the variation in pressure and conveyance force ratio with distance along the conveyance conduit from its inlet. Straight line 70 indicates a conveyance force ratio of 1.0 which is the minimum which must be exceeded throughout the length of the conveyance zone. Curve 72, which is also a straight line, indicates a conveyance force ratio sufficiently above the minimum value of 1.0 to maintain granular solids motion in the conduit. The value of 1.1 shown by curve 72 corresponds to a closely designed conveyance conduit having a taper or cross-sectional area which is sufficient to maintain a constant fluid velocity and, consequently, a constant pressure drop per unit length along the line. Corresponding to curve 72 is curve 74, also a straight line, indicating a linear decrease in conveyance fluid pressure throughout the length of the conveyance conduit. Under conditions of operation referred to above which adversely affect the conveyance force ratio, a conveyance conduit having a taper sufficient to maintain the constant force ratio as given by curve 72 and a linear pressure drop as shown by curve 74 will be adversely affected by changes in operating conditions resulting in a conveyance force ratio which changes in the line according to curve 77. It is indicated that this ratio falls below the minimum value of 1.0 required to maintain solids motion throughout part of the conduit.

By the injection of supplemental quantities of conveyance fluid at points 76, 78 and 80 the decreasing force ratio depicted by curve 77 is increased throughout the succeeding sections of the conveyance conduit to establish and maintain a conveyance force ratio greater than 1.1 at all points as given by curve 82. Although a slight variation in conveyance force ratio exists in each segment of the line, the overall average value is maintained at or near the design value. If such a variation is too great additional quantities may be injected between the points shown.

The application of the principles of the present invention are more clearly shown in connection with the following examples.

EXAMPLE I

In a catalytic cracking process a catalyst recirculation at a rate of 100 tons per hour is maintained using the process of this invention. The normal conditions of conveyance operation and the average physical characteristics of the catalyst circulated are given below:

Table 1

$a = 0.98$ (adsorptive catalyst)
$\rho_s = 42.2$ lbs./cu. ft.
$C = 65$
$T = 1360°$ R.
$Q = 55.6$ lbs./second (100 tons/hour)
$M.W. = 29$ (air)
$L = 40$ feet (vertical)
$\frac{dp}{dl} = 1.1\rho_s = 46.4$ lbs./sq. ft./ft.

For a discharge pressure of 14.7 lbs./square inch absolute ($P_2 = 2120$ lbs./sq. ft.) the variation in conveyance fluid pressure under normal conditions along the length of the 40 foot line is calculated from the equation $$P_1 = 2120 + (L)\left(\frac{dp}{dl}\right)$$

and the values of pressure are given below in Table 2:

Table 2

| Distance from Line Inlet, Feet | Conveyance Fluid Pressure, Lbs./sq. ft. | Inside Diameter of Line, Inches |
| --- | --- | --- |
| 0 | 3,976 | 7.98 |
| 10 | 3,512 | 8.81 |
| 20 | 3,048 | 9.68 |
| 30 | 2,584 | 10.66 |
| 40 | 2,120 | 11.76 |

The conveyance fluid introduction rate is 102.7 S. C. F. M. (standard cubic feet per minute). This conveyance conduit designed specifically for the conditions given above has a non-linear variation of inside diameter increasing from 7.98 inches at the inlet to 11.76 inches at the outlet and within which, for the normal design conditions of operation, the pressure gradient is such that a constant conveyance force ratio of 1.1 is maintained.

To show the effect of changes in operating conditions and/or changes in physical characteristics of the solids upon the operation of the above described conveyance conduit, the following data are given:

EXAMPLE II

With aged catalyst circulated according to the conditions given in Example I the value of C is increased to 95, $\rho_s$ increases to 51 lbs./cu. ft. and "$a$" decreases to 0.97. From the correlation given above it may be determined that the average value of the conveyance force ratio in a conveyance line having the outlet and inlet pressures and the diameter characteristics given in Table 2 decreases from a value of 1.1 to a value of 1.038. This value is dangerously low for smooth and efficient operation since slight further changes in flow rate or temperature or in the other variables might stop operation altogether. The conveyance fluid flow rate under such conditions is 88.2 S. C. F. M.

According to the process of the present invention the improved type of conduit has the maximum value of taper of the conveyance zone using the maximum expected values of $a$, $Q$, $M.W.$ and $C$ and the minimum values of $\rho_s$ and $T$ in the correlation given above.

EXAMPLE III

The conveyance conduit of improved design is constructed to perform under the extreme expected operating conditions and solids characteristics referred to above, for example:

Table 3

$a = 0.98$
$Q = 69.5$ lbs./second (125 tons/hour)
$M.W. = 29$ (air)
$C = 95$
$\rho_s = 42.2$ lbs./cu. ft.
$T = 1360°$ R.

Based upon the same outlet pressure of 2120 lbs./sq. ft., and the same inlet area to the line of 0.347 sq. ft. (circular 7.98" i. d.), the variations in line diameter and conveyance fluid pressure are given in Table 4:

Table 4

| Distance from Line Inlet, Feet | Conveyance Fluid Pressure, Lbs./sq. ft. | Inside Diameter of Line, Inches |
| --- | --- | --- |
| 0 | 3,976 | 7.98 |
| 10 | 3,512 | 9.07 |
| 20 | 3,048 | 10.22 |
| 30 | 2,584 | 11.45 |
| 40 | 2,120 | 12.83 |

It is seen, upon comparing of the line diameter data in Table 4 with the data given in Table 2, that a greater change in the inside diameter of the conveyance conduit is required, the outlet area being about 20% greater than in Example I. When operating this line with the maximum and minimum values for the design conditions given above, ample conveyance fluid is provided in the single stream introduced with granular solids into the inlet of the conveyance zone and no supplemental flow is required.

However, when operating at other than these extreme expected conditions, such as, for example, those conditions normal in the specific operation and which are given in Table 1, supplemental streams of conveyance fluid must be introduced along the length of the conveyance conduit to make up the deficiency of conveyance fluid existing in the above conduit having a maximum taper and which is operated at other than the extreme conditions given.

EXAMPLE IV

When the conveyance conduit of Example III is operated under the "normal" conditions given in Table 1 it is found that 107.5 standard cubic feet/minute of conveyance fluid flow into the inlet of the line, sufficient to establish a conveyance force ratio there which is greater than 1.0. The quantities of supplemental conveyance fluid required in the operation are introduced at the points and in the quantities indicated in Table 5.

*Table 5*

| Distance from Solids Inlet | Conveyance Fluid Pressure, Lbs./sq. ft. | Quantity of Supplemental Conveyance fluid, S. C. F. M. |
| --- | --- | --- |
| 0 | 4,058 | 107.5 |
| 10 | 3,567 | 3.0 |
| 20 | 3,082 | 3.1 |
| 30 | 2,600 | 2.9 |
| 40 | 2,120 | |

EXAMPLE V

In the apparatus of Example III the following characteristics of operation are noted when operating at the normal conditions but without the supplemental conveyance fluid injection.

*Table 6*

| Distance from Solids Inlet | Conveyance Fluid Pressure, Lbs./sq. ft. | Conduit Diam., In. I. D. | Conveyance Force Ratio |
| --- | --- | --- | --- |
| 0 | 4,259 | 7.98 | 1.458 |
| 10 | 3,668 | 9.07 | 1.354 |
| 20 | 3,116 | 10.22 | 1.263 |
| 30 | 2,600 | 11.45 | 1.178 |
| 40 | 2,120 | 12.83 | 1.10 |

The quantity of fluid introduced into the line is 116.6 S. C. F. M. It is to be noted that a substantial increase (29%) in the conveyance force ratio is required along with higher required inlet pressure to cause solids motion under these circumstances. The horsepower requirement for operating the conduit thus is raised considerably over that required when the supplemental fluid injection of Example IV is used according to this invention.

Thus it is seen that the conveyance conduit designed as in Example III is operable throughout the range of design condition variations and that supplemental conveyance fluid is introduced in a total amount approximating 8.4% of the main conveyance fluid stream when normal operating conditions are encountered and 0% when extreme conditions occur. The flow rates of the supplemental conveyance fluid streams are automatically controlled in accordance with differential pressure controllers actuated by means of the pressure differential existing across an interval of conveyance zone downstream from the particular inlet point. Hereby the supplemental fluid flow rate is automatically controlled to maintain a pressure gradient greater than $1.1\rho_s \cos \theta$ within the conduit.

From the above examples it is apparent that the flow of compact granular solids through conduits may be maintained in spite of radical changes in the operating conditions or physical changes in the granular solids by providing a conveyance conduit having a cross-sectional area with a maximum increase in the direction of solids flow in accordance with the correlation given for the worst expected operating conditions and having inlets for supplemental conveyance fluid along the length thereof.

The foregoing examples indicate that a distinct improvement is made by employing the process and apparatus of the present invention in those situations in which greater flexibility of operation is desirable. Particularly is this true in the typical recirculatory catalytic and adsorptive processes in which the nature of the granular solids changes appreciably with use.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64%[1]) and the greatest bulk density (about 41.5% greater) when uniformly packed with particle centers coinciding with the apexes of a tetrahedron (rhombohedral packing—pore volume 25.95%[1]). The bulk density of solids during conveyance according to this invention is intermediate between the bulk densities of solids uniformly packed according to the foregoing systems and is apparently a random mixture of several packing geometries. Similar density variations occur in packings of non-uniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
| --- | --- |
| Conduit height, feet | 27.25 |
| Conduit attitude | Vertical |
| Conduit diameter, inches: | |
|   Inlet | 3.068 |
|   Outlet | 4.000 |
| Conveyance fluid | Air |
| Solids mesh size | 4–10 |
| Solids flow rate, lb./hr | 4,500 |
| Solids vibrational bulk density, lb./cu. ft | 46.7 |

Upon depressing the conveyance fluid from the bottom of the conduit while preventing further introduction of solids thereto, it was noted that the solids level dropped only 0.25 feet from the solids outlet at the top of the 27.25 foot line, indicating an operating solids bulk density of 46.3 pounds per cubic foot during conveyance. This

---

[1] Micromeritics—J M Dalla Valle (1943), p. 105.

is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient, or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decrease this differential pressure, while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12-30 mesh adsorbent carbon as a dilute suspension in air the pressure differential is 1.12 pounds per square inch and a 10% increase in the air input decreases the pressure differential to 0.99 pound per square inch. Similarly, in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\frac{dp}{dl}}{\rho_s \cos \theta}$$

(the terms of which are given elsewhere herein). Except in relatively rare cases when the operating bulk density is decreased by an amount approaching 20% of the vibrational bulk density $\rho_s$, due to packing rearrangements of the compact solids and the ratio thus determined, may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase in size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and is not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it also is applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for conveyance of granular solids of variable physical characteristics under variable conditions of operation which comprises introducing solids to be conveyed into the entrance of an elongated conveyance zone having an increasing cross-sectional area in the direction of flow, introducing thereinto a conveyance fluid under pressure, flowing said conveyance fluid concurrently with said solids through said conveyance zone at a rate sufficient to establish a pressure gradient $$\frac{dp}{dl}$$

(in pounds per square foot per foot) exceeding $\rho_s \cos \theta$ (where $\rho_s$ is the solids bulk density in pounds per cubic foot and $\theta$ is the angular deviation of the conveyance zone from the vertical) at said entrance, restricting the discharge of the mass of solids from the outlet of said conveyance conduit to maintain the granular solids as a mass having substantially the solids' static bulk density throughout the entire length of said conveyance zone, introducing at least one supplemental stream of conveyance fluid at a point along the length of said conveyance zone, and controlling the quantity of such supplemental streams to compensate for changes in solids physical characteristics and operating conditions and maintain a substantially constant pressure gradient $$\frac{dp}{dl}$$

throughout said conveyance zone greater than $\rho_s \cos \theta$.

2. A process according to claim 1 wherein a plurality of supplemental streams of conveyance fluid are introduced into said conveyance zone.

3. A process according to claim 1 in combination with the step of controlling the flow rate of the supplemental conveyance fluid stream thus introduced in accordance with and to maintain a substantially constant pressure gradient $$\frac{dp}{dl}$$

over an incremental length of said conveyance zone downstream from the point of introduction thereof into said conveyance zone.

4. In a process for the conveyance of granular solids which comprises introducing granular solids into a conveyance zone, passing a conveyance fluid under pressure thereinto thereby passing said conveyance fluid cocurrently with granular solids through said conveyance zone, and restricting the discharge of the mass of solids from the outlet of said conveyance zone thereby maintaining said granular solids as a mass having substantially the solids' static bulk density entirely throughout the length of said conveyance zone, the improvement which comprises introducing into said conveyance zone a quantity of conveyance fluid less than that required to maintain a substantially constant pressure gradient and conveyance force ratio throughout said conveyance zone, introducing at least one stream of supplemental conveyance fluid along the length thereof to increase the conveyance force ratio throughout said conveyance zone to a substantially constant value greater than 1.0, and controlling the flow rate of the supplemental conveyance fluid to compensate for changes in physical characteristics of said solids and operating conditions to maintain said conveyance force ratio.

5. In a process for the conveyance of granular solids which comprises introducing granular solids into a conveyance zone, passing a conveyance fluid under pressure thereinto thereby passing said conveyance fluid cocurrently with granular solids through said conveyance zone, and restricting the discharge of the solids mass from the outlet of said conveyance zone thereby maintaining said granular solids as a mass having substantially the solids' static bulk density throughout said conveyance zone, the improvement which comprises introducing into the entrance of said conveyance zone a quantity of conveyance fluid sufficient to establish a pressure gradient $$\frac{dp}{dl}$$

(pounds per square foot per foot) exceeding $\rho_s \cos \theta$ (where $\rho_s$ is the solids bulk density in pounds per cubic foot and $\theta$ is the angular deviation of the conveyance zone from the vertical) at said entrance, introducing at lease one supplemental stream of conveyance fluid into said conveyance zone along the length thereof, controlling the flow rate of said supplemental stream in inverse proportion to the pressure gradient $$\frac{dp}{dl}$$

existing in said conveyance zone downstream from the point of introduction to maintain throughout said conveyance zone a pressure gradient $$\frac{dp}{dl}$$

exceeding $\rho_s \cos \theta$ and a substantially constant conveyance force ratio $$\frac{\frac{dp}{dl}}{\rho_s \cos \theta}$$

at a value exceeding 1.0 in spite of variations in solids characteristics and operating conditions within the conveyance zone.

6. In a process for the conveyance of granular solids which comprises introducing said solids into a conveyance zone cocurrently with a conveyance fluid under pressure thereby flowing said conveyance fluid therethrough to establish movement of said solids, and applying a thrust force to the solids discharge therefrom to prevent solids fluidization and maintain said solids during transit as a mass extending entirely through said conveyance zone and having substantially the solids' static bulk density, the improvement which comprises providing said conveyance zone with a cross-sectional area open to solids flow which increases in the flow direction substantially according to the following correlation:

$$\frac{A_2}{A_1} = \frac{1}{A_1} \left(\frac{aQ}{\rho_s}\right) \left(\frac{M.W.}{RT}\right)^{1-\frac{1}{n}} (P_1 - P_2) \left(\frac{C}{P_2 \frac{dp}{dl}}\right)^{\frac{1}{n}} + \left(\frac{P_1}{P_2}\right)^{\frac{1}{n}}$$

wherein $a$ is the void fraction of the bulk of the solids; no units; maximum expected values,
A, cross-sectional area of conduit; square feet,
C, permeability constant as determined from:

$$\frac{dp}{dl} = C\rho^{n-1} V^n$$

wherein $$\frac{dp}{dl}$$

is pressure gradient; pounds per square foot per foot,
$\rho$ is the fluid density; pounds per cubic foot,
V, superficial gas velocity; feet per second,
$n$, exponent; 1.0 for viscous flow and 1.85 for turbulent flow, (maximum expected values for C being used)

M. W., molecular weight of conveyance fluid; maximum expected values,
P, pressure in conduit; pounds per square foot,
Q, solids flow rate, pounds per second; maximum expected values,
R, gas constant; 1543 foot pounds per ° R. per pound mol,
T, temperature; °R.=460+°F.; minimum expected values,
$\rho_s$, bulk density of solids; pounds per cubic foot; minimum expected values,
1, subscript; reference to inlet of conduit section considered,
2, subscript; reference to outlet of conduit section considered.

and injecting supplemental conveyance fluid at at least one intermediate point along said conveyance zone at a rate controlled to maintain a conveyance force ratio $$\frac{\frac{dp}{dl}}{\rho_s \cos \theta}$$

greater than 1.0 throughout said conveyance zone in spite of changes in solids characteristics and operating conditions.

7. A process for conveying granular solids which comprises introducing granular solids into an elongated conveyance zone, the cross-sectional area of which increases in the flow direction according to the correlation:

$$\frac{A_2}{A_1} = \frac{1}{A_1}\left(\frac{aQ}{\rho_s}\right)\left(\frac{M.W.}{RT}\right)^{1-\frac{1}{n}} (P_1-P_2)\left(\frac{C}{P_2\frac{dp}{dl}}\right)^{\frac{1}{n}} + \left(\frac{P_1}{P_2}\right)^{\frac{1}{n}}$$

wherein $a$ is the void fraction of the bulk of the solids; no units; maximum expected values,
A, cross-sectional area of conduit; square feet,
C, permeability constant as determined from:

$$\frac{dp}{dl} = C\rho^{n-1}V^n$$

wherein $\frac{dp}{dl}$ is pressure gradient; pounds per square foot per foot,
$\rho$ is the fluid density; pounds per cubic foot,
V, superficial gas velocity; feet per second,
$n$, exponent; 1.0 for viscous flow and 1.85 for turbulent flow, (maximum expected values for C being used)

M.W., molecular weight of conveyance fluid; maximum expected values,
P, pressure in conduit; pounds per square foot,
Q, solids flow rate, pounds per second; maximum expected values,
R, gas constant; 1543 foot pounds per °R. per pound mol,
T, temperature; °R.=460+°F.; minimum expected values,
$\rho_s$, bulk density of solids; pounds per cubic foot; minimum expected values,
1, subscript; reference to inlet of conduit section considered,
2, subscript; reference to outlet of conduit section considered, to maintain therein a substantially constant conveyance force ratio $$\frac{\frac{dp}{dl}}{\rho_s \cos\theta}$$

(wherein $\theta$ is the angular deviation of the conveyance zone from the vertical)

introducing a conveyance fluid under pressure into said conveyance zone with said solids to establish a conveyance force ratio of above 1.0 at least at the inlet of said conveyance zone maintaining the granular solids during transit as a mass extending entirely throughout said conveyance zone and having substantially the solids static bulk density by restricting the discharge of the mass of solids from the outlet of said zone, injecting at least one supplementary stream of conveyance fluid into said conveyance zone along the length thereof when the existing values of $a$, Q, M.W., C, $\rho_s$ and T determine a value of $A_2/A_1$ less than that given above, and controlling the flow of the supplementary stream to values sufficient to maintain a conveyance force ratio of greater than 1.0 downstream from the injection point in spite of the changes in said values of $a$, Q, M.W., C, $\rho_s$ and T.

8. A process for conveyance of granular solids which comprises introducing a stream of granular solids into a conveyance zone, the cross-sectional area of which increases in the direction of flow according to the correlation:

$$\frac{A_2}{A_1} = \frac{1}{A_1}\left(\frac{aQ}{\rho_s}\right)\left(\frac{M.W.}{RT}\right)^{1-\frac{1}{n}} (P_1-P_2)\left(\frac{C}{P_2\frac{dp}{dl}}\right)^{\frac{1}{n}} + \left(\frac{P_1}{P_2}\right)^{\frac{1}{n}}$$

wherein $a$ is the void fraction of the bulk of the solids; no units; maximum expected values,
A, cross-sectional area of conduit; square feet,
C, permeability constant as determined from:

$$\frac{dp}{dl} = C\rho^{n-1}V^n$$

wherein $\frac{dp}{dl}$ is pressure gradient; pounds per square foot per foot,
$\rho$ is the fluid density; pounds per cubic foot,
V, superficial gas velocity; feet per second,
$n$, exponent; 1.0 for viscous flow and 1.85 for turbulent flow, (maximum expected values for C being used)

M.W., molecular weight of conveyance fluid; maximum expected values,
P, pressure in conduit; pounds per square foot,
Q, solids flow rate, pounds per second; maximum expected values,
R, gas constant; 1543 foot pounds per °R. per pound mol,
T, temperature; °R.=460+°F.; minimum expected values,
$\rho_s$, bulk density of solids; pounds per cubic foot; minimum expected values,
1, subscript; reference to inlet of conduit section considered,
2, subscript; reference to outlet of conduit section considered, introducing a conveyance fluid under pressure into said conveyance zone with said solids at a rate sufficient to establish a conveyance force ratio $$\frac{\frac{dp}{dl}}{\rho_s \cos\theta}$$

(wherein $\theta$ is the angular deviation of the conveyance zone from the vertical)

greater than 1.0 at the inlet to said conveyance zone, introducing at least one stream of supplementary conveyance fluid along the length of said conveyance zone when the existing values of $a$, Q, M.W., $\rho_s$ and T are such as to determine a value of $A_2/A_1$ less than that given above, controlling the flow rate of said supplementary conveyance fluid in sufficient amount to maintain said conveyance force ratio throughout said conveyance zone above 1.0, and restricting the discharge of the mass of compact solids from the outlet of said conveyance zone thereby maintaining said granular solids during transit as a dense mass extending entirely through said conveyance zone and having substantially the solids' static bulk density.

9. A process according to claim 8 in combination with the step of varying the supplemental flow of conveyance fluid inversely with the determined value of $$\frac{dp}{dl}$$

in said conveyance zone beyond the supplemental fluid introduction point.

10. A process according to claim 8 in combination with the step of controlling the supplemental fluid introduction rate to maintain a value of $$\frac{dp}{dl}$$

in said conveyance zone beyond the introduction point greater than $\rho_s \cos \theta$ by changing said rate inversely with determined values of $$\frac{dp}{dl}$$

11. A method for conveying granular solids through a conveyance zone through which they would not flow in the same direction under the influence of gravity alone which comprises passing a conveyance fluid through a substantially compact moving bed of said solids in said conveyance zone at a velocity sufficient to overcome forces of gravity and friction forces of inner conveyance zone surfaces acting on said moving bed, injecting additional conveyance fluid into the mass of solids moving through said conveyance zone and at a point intermediate the inlet and outlet thereof, discharging said moving bed of solids from the outlet of said conveyance zone, applying a solids compacting force to said moving bed discharging from said outlet to maintain said solids throughout the entire length of said conveyance zone at a bulk density substantially equal to the static bulk density of said solids when at rest, and controlling the rate of flow of said additional conveyance fluid injection to maintain said velocity sufficient to overcome said forces downstream from the point of injection.

12. In a process for the recirculation of granular solids through at least one fluid-solids contacting zone under operating conditions which may involve variations in the voids fraction, flow rate, bulk density, and the fluid permeability of the granular solids mass, and variations in the molecular weight and temperature of the conveyance fluid, which process comprises flowing solids through said contacting zone, contacting said solids therein with a fluid stream, flowing solids from said contacting zone into an induction zone communicating with a conveyance zone, introducing a conveyance fluid under pressure into said induction zone thereby flowing said conveyance fluid from said induction zone cocurrently with a continuous moving porous mass of substantially compact solids through said conveyance zone, applying a thrust force to the discharge of solids from said conveyance zone without substantial restriction of conveyance fluid discharge to maintain the moving granular solids as a dense mass having substantially the solids' static bulk density and extending entirely throughout the length of said conveyance zone, and maintaining a conveyance force ratio within said conveyannce zone of $$\frac{\frac{dp}{dl}}{\rho_s \cos \theta} > 1.0$$

(wherein $$\frac{dp}{dl}$$

is the pressure gradient, $\rho_s$ is the bulk density of the granular solids and $\theta$ is the angular deviation of the conveyance zone from the vertical), the improvement which comprises introducing a supplemental stream of conveyance fluid at each of a plurality of spaced points along the length of said conveyance zone, said conveyance zone having an increasing cross-sectional area in the direction of flow determined by the correlation:

$$\frac{A_2}{A_1} = \frac{1}{A_1}\left(\frac{aQ}{\rho_s}\right)\left(\frac{M.W.}{RT}\right)^{1-\frac{1}{n}}(P_1 - P_2)\left(\frac{C}{P_2 \frac{dp}{dl}}\right)^{\frac{1}{n}} + \left(\frac{P_1}{P_2}\right)^{\frac{1}{n}}$$

wherein $a$ is the void fraction of the bulk of the solids; no units; maximum expected values,
A, cross-sectional area of conduit; square feet,
C, permeability constant as determined from:

$$\frac{dp}{dl} = C \rho^{n-1} V^n$$

wherein $$\frac{dp}{dl}$$

is pressure gradient; pounds per square foot per foot,
$\rho$ is the fluid density; pounds per cubic foot,
V, superficial gas velocity; feet per second,
$n$, exponent; 1.0 for viscous flow and 1.85 for turbulent flow, (maximum expected values for C being used)

M. W., molecular weight of conveyance fluid; maximum expected values,
P, pressure in conduit; pounds per square foot,
Q, solids flow rate, pounds per second; maximum expected values,
R, gas constant; 1543 foot pounds per °R. per pound mol,
T, temperature; °R.=460+°F.; minimum expected values,
$\rho_s$, bulk density of solids; pounds per cubic foot; minimum expected values,
1, subscript; reference to inlet of conduit section considered,
2, subscript; reference to outlet of conduit section considered, and controlling the quantity of supplemental conveyance fluid injected at each point in accordance with the pressure gradient $$\frac{dp}{dl}$$

existing in the conveyance zone downstream from each supplemental injection point to maintain therein a pressure gradient $$\frac{dp}{dl} > \rho_s \cos \theta$$

to maintain granular solids flow thereby under conditions wherein values less than the maximum values of $a$, Q, M. W., and C and values greater than the minimum values of $\rho_s$ and T exist within said conveyance zone.

13. A process according to claim 12 wherein the flow rate of each supplemental stream of conveyance fluid is varied inversely with variations in the measured pressure gradient existing downstream therefrom.

14. A process according to claim 13 wherein the flow rate of each supplemental conveyance fluid stream is controlled in accordance with a continuous determination of pressure gradient along said conveyance zone.

15. A process according to claim 14 wherein the intervals between said supplemental conveyance fluid injection points are between 5 and 100 conveyance zone diameters.

16. An apparatus for the conveyance of granular solids which comprises an elongated conveyance conduit, means for introducing granular solids thereinto, an inlet conduit for a fluid under pressure communicating with the entrance of said conveyance conduit, means for depressuring said fluid cocurrently with said solids through said conduit, means for restricting discharge of granular solids to maintain said solids entirely throughout the length of said conveyance conduit as a moving mass having substantially the solids' static bulk density, at least one supplemental conveyance fluid conduit opening into said conveyance conduit along the length thereof, and means for varying the flow rate of said supplemental conveyance fluid flow to maintain a predetermined pressure gradient $$\frac{dp}{dl}$$

in pounds per square foot per foot, greater than $\rho_s \cos \theta$ within said conduit downstream from the supplemental fluid inlet point, $\rho_s$ being the solids' static bulk density in pounds per cubic foot, and $\theta$ being the angular deviation of the solids flow direction from a vertical upward reference axis.

17. An apparatus for the conveyance of granular solids which comprises an elongated conveyance conduit having a cross-sectional area which increases in the direction of flow according to the correlation:

$$\frac{A_2}{A_1} = \frac{1}{A_1}\left(\frac{aQ}{\rho_s}\right)\left(\frac{M.W.}{RT}\right)^{1-\frac{1}{n}}(P_1-P_2)\left(\frac{C}{P_2\frac{dp}{dl}}\right)^{\frac{1}{n}} + \left(\frac{P_1}{P_2}\right)^{\frac{1}{n}}$$

(wherein $a$ is the void fraction of the bulk solids, A is the cross-sectional area in square feet of the conveyance conduit, $$\frac{dp}{dl}$$

is the pressure gradient in pounds per square foot per foot, $\rho$ is the fluid density in pounds per cubic foot, V is the superficial fluid velocity in feet per second, $n$ is an exponent equal to 1.0 for viscous flow and 1.85 for turbulent flow, P is the pressure in pounds per square foot, Q is solids flow rate in pounds per second, R is the gas constant 1543, T is the temperature °R., $\rho_s$ is the bulk density of the solids in pounds per cubic foot, 1 and 2 are subscripts relating to the inlet and the outlet of the section of the conduit considered and C is determined experimentally from $$\frac{dp}{dl} = C\rho^{n-1}V^n$$

for the solids and conveyance fluid employed), said cross-sectional area being calculated using maximum expected values of $a$, Q, C and M. W. and minimum values of $\rho_s$ and T expected in the anticipated operation, means for introducing granular solids and a conveyance fluid under pressure into said conduit, means for restricting the discharge of granular solids therefrom to maintain the solids therein as a moving mass having substantially the solids' static bulk density and extending throughout the entire length of said conveyance conduit, a plurality of inlet conduits at spaced points along the length of said conveyance conduit for supplemental conveyance fluid under pressure, fluid flow control means in each of said inlet conduits, and means for actuating said control means in accordance with the pressure gradient existing within said conveyance conduit to maintain a pressure gradient throughout the entire length thereof sufficient to overcome forces of gravity and friction acting on said solids in spite of variations in characteristics of said solids and said conveyance fluid.

18. An apparatus according to claim 17 wherein said means for introducing solids and conveyance fluid into said conveyance conduit comprises an induction chamber, an outlet in the bottom thereof communicating with the entrance of said conveyance conduit, an inlet conduit for granular solids into said chamber, and an inlet conduit for a conveyance fluid under pressure into said chamber.

19. An apparatus according to claim 17 in combination with a differential pressure controller adapted to detect the pressure gradient within said conveyance conduit downstream from a supplemental conveyance fluid inlet and vary the flow of fluid introduced thereinto to maintain the predetermined pressure gradient.

20. An apparatus according to claim 19 wherein a differential pressure controller is provided for each of the plurality of supplemental conveyance fluid inlet conduits.

References Cited in the file of this patent

UNITED STATES PATENTS

| | | |
|---|---|---|
| 494,274 | Kelley | Mar. 28, 1893 |
| 2,311,564 | Munday | Feb. 16, 1943 |
| 2,392,765 | Reeves | Jan. 8, 1946 |
| 2,493,911 | Brandt | Jan. 10, 1950 |
| 2,509,983 | Morrow | May 30, 1950 |
| 2,561,771 | Ardern | July 24, 1951 |
| 2,666,731 | Bergstrom | Jan. 19, 1954 |

FOREIGN PATENTS

| | | |
|---|---|---|
| 180,397 | Great Britain | May 11, 1922 |
| 268,667 | Great Britain | Feb. 7, 1927 |
| 7,075 | Netherlands | Mar. 18, 1922 |